Jan. 6, 1931.  J. F. BRAND  1,788,273
AUTOMOBILE IDENTIFICATION PLATE
Filed May 31, 1930
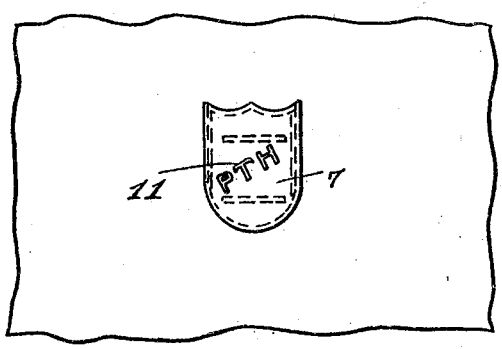
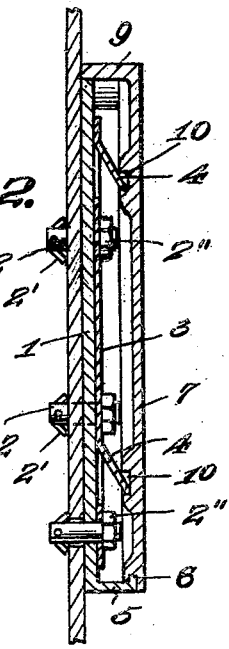
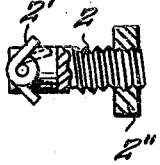
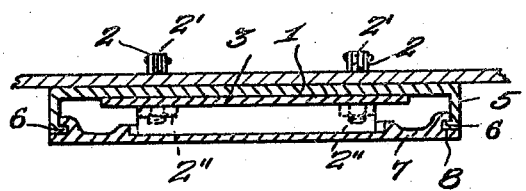
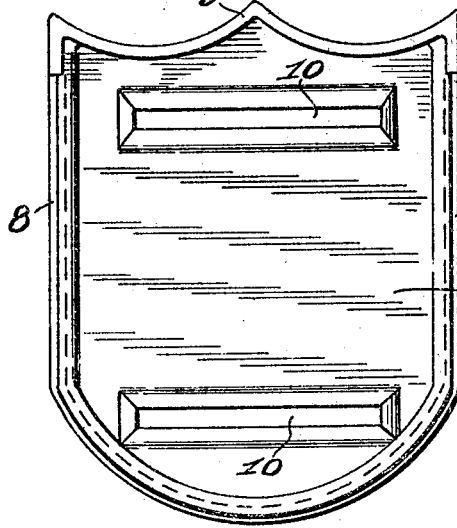
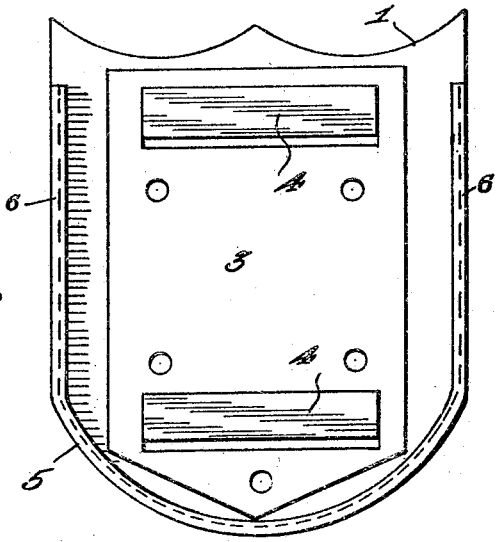
John F. Brand, INVENTOR
BY Victor J. Evans ATTORNEY Patented Jan. 6, 1931

1,788,273

UNITED STATES PATENT OFFICE

JOHN F. BRAND, OF UTICA, NEW YORK

AUTOMOBILE IDENTIFICATION PLATE

Application filed May 31, 1930. Serial No. 458,673.

This invention relates to an identification plate for motor vehicles and the like, the general object of the invention being to provide a plate of attractive design and having identification data thereon, with means for locking the plate to a part of the vehicle so that it is practically impossible to remove the plate after the same has been placed in position.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawings wherein like characters denote like or corresponding parts throughout the several views, and in which:—

Figure 1 is a view of part of an automobile.

Figure 2 is a vertical sectional view through Figure 1.

Figure 3 is a transverse sectional view through Figure 1.

Figure 4 is a view of the members which are fastened to the vehicle and act as supporting and locking means for the identification plate.

Figure 5 is a rear view of the plate.

Figure 6 is a view of one of the bolts used with the device.

In this drawing, the numeral 1 indicates a plate which is fastened by the bolts 2 or other fastening means to a part of the vehicle, such as a door. These fastening means should be of such a character as to make it practically impossible to remove the parts after the device is attached to the vehicle. The drawing shows the bolts with springs 2' on their inner ends so that the bolts can be pushed through holes in the door or other part of the vehicle and then the springs will expand and hold the bolts in the holes. The nuts 2'' are located in the device so that access to the nuts and bolts is prevented and the covering means on the inside of the vehicle prevent access to the springs. Of course, other means may be used for preventing the bolts from being removed.

A plate 3 of smaller dimensions than the plate 1 is held against the said plate 1 by the bolts and this plate 3 is provided with the spring tongues 4 which are bent outwardly, as shown. The sides and bottom of the plate 1 are bent outwardly at right angles to provide the flanges 5 and the outer edges of these flanges are bent inwardly to form the small flanges 6. The outer plate 7 is formed with thickened parts at its sides and bottom which are grooved, as at 8, to receive the flanges 6, as shown in Figures 2 and 3. Thus the plate 7 can be moved downwardly over the plate 1, with the flanges 5 engaging the grooves 8 and when the plate 7 is in position, a flange 9 at the top thereof will engage the upper edge of the plate 1. The inner face of the plate 7 is formed with the transverse slots 10 which will receive the edges of the tongues 4 when the plate 7 is in position fully covering the plate 1 so that said tongues will prevent the plate 7 from being removed from the plate 1 as these tongues and the grooves act as locking means for preventing removal of the plate 7. Thus the plate 7 is locked in position and as before stated, access to the nuts on the bolts 2 is prevented by the plate 7 so that the parts cannot be removed. The arrangement of the flanges and grooves prevents a tool or the like being placed between the parts in an attempt to remove the plate 7 and this arrangement also acts to make a waterproof and dustproof connection between the parts. The plate 7 carries suitable identification data, as shown at 11 in Figure 1.

Thus I have provided simple means for enabling one to identify a vehicle if the same is stolen or identification is otherwise needed.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:—

An identification plate for vehicles comprising a plate having outwardly extending flanges at its sides and bottom, a small plate seated on the outer face of the first plate and carrying spring tongues, bolts passing through a part of the vehicle and through the two plates with their nuts engaging the small plate, a third plate having identification means on its outer face, with an inwardly extending flange at its top and grooves in its side and bottom edges and the flanges of the first plate having inwardly extending parts for engaging the grooves and said third plate having grooves in its inner face for receiving the ends of the spring tongues when the third plate is in position covering the other plates.

In testimony whereof I affix my signature.

JOHN F. BRAND.